(12) United States Patent
Takesue et al.

(10) Patent No.: US 10,321,017 B2
(45) Date of Patent: Jun. 11, 2019

(54) IMAGE PROCESSING APPARATUS FOR IMPROVING IMAGE SHARPNESS ACCORDING TO THE OUTPUT CONDITION, IMAGE PROCESSING METHOD AND PROGRAM

(71) Applicant: CANON KABUSHIKI KAISHA, Tokyo (JP)

(72) Inventors: Naoya Takesue, Tokyo (JP); Hisashi Ishikawa, Urayasu (JP); Tomokazu Yanai, Yokohama (JP); Hiroyuki Sakai, Chigasaki (JP); Yoshinori Nakajima, Yokohama (JP); Hajime Nagai, Kawasaki (JP); Yumi Shimokodachi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 9 days.

(21) Appl. No.: 15/576,631

(22) PCT Filed: May 13, 2016

(86) PCT No.: PCT/JP2016/002366
§ 371 (c)(1),
(2) Date: Nov. 22, 2017

(87) PCT Pub. No.: WO2016/194313
PCT Pub. Date: Dec. 8, 2016

(65) Prior Publication Data
US 2018/0160012 A1 Jun. 7, 2018

(30) Foreign Application Priority Data
May 29, 2015 (JP) .................................. 2015-110217

(51) Int. Cl.
*H04N 1/40* (2006.01)
*H04N 1/409* (2006.01)
(Continued)

(52) U.S. Cl.
CPC .......... *H04N 1/4092* (2013.01); *G06T 5/003* (2013.01); *G06T 5/10* (2013.01); *G06T 5/20* (2013.01);
(Continued)

(58) Field of Classification Search
None
See application file for complete search history.

(56) References Cited

U.S. PATENT DOCUMENTS 6,091,520 A * 7/2000 Hibi ........................ H04N 1/40
358/530
7,065,257 B2 * 6/2006 Soga .................... H04N 1/2112
358/520
(Continued)

FOREIGN PATENT DOCUMENTS

JP 2001188903 A 7/2001
JP 2011022868 A 2/2011
(Continued)

*Primary Examiner* — Barbara D Reinier
(74) *Attorney, Agent, or Firm* — Canon U.S.A. Inc., IP Division

(57) ABSTRACT

An image processing apparatus according to the present invention includes an acquisition unit configured to acquire an output condition when an image forming apparatus forms an image on a recording medium based on image data, and a processing unit configured to perform image processing on the image data for improving sharpness of the image by using a parameter based on the output condition. The parameter to be referred to by the processing unit represents such a characteristic that the image formed by the image forming apparatus has a luminous characteristic in relation to spatial frequency that remains constant or decreases continuously without causing any inflection point or any discontinuous point in a frequency band from a predetermined frequency to a limit frequency of the image forming apparatus.

12 Claims, 15 Drawing Sheets

(51) Int. Cl.
  *G06T 5/20*      (2006.01)
  *G06T 5/10*      (2006.01)
  *G06T 5/00*      (2006.01)
  *H04N 1/52*      (2006.01)

(52) U.S. Cl.
  CPC ..... *H04N 1/52* (2013.01); *G06T 2207/20056* (2013.01)

(56) References Cited

U.S. PATENT DOCUMENTS

| | | | |
|---|---|---|---|
| 2002/0030690 A1* | 3/2002 | Someya | G06T 5/20 345/598 |
| 2003/0052979 A1* | 3/2003 | Soga | H04N 1/2112 348/241 |
| 2013/0177260 A1* | 7/2013 | Fujii | H04N 1/4092 382/309 |
| 2016/0110852 A1* | 4/2016 | Yanai | G06T 5/003 382/264 |
| 2016/0253783 A1* | 9/2016 | Higashi | G06T 3/4053 382/168 |
| 2016/0295071 A1* | 10/2016 | Takesue | H04N 1/4092 |
| 2017/0084006 A1* | 3/2017 | Stewart | G06T 5/002 |
| 2017/0230567 A1* | 8/2017 | Takao | H04N 5/23212 |
| 2017/0310851 A1* | 10/2017 | Dobashi | H04N 1/4051 |
| 2018/0013920 A1* | 1/2018 | Dobashi | H04N 1/58 |

FOREIGN PATENT DOCUMENTS

| | | |
|---|---|---|
| JP | 2011024049 A | 2/2011 |
| JP | 2011024050 A | 2/2011 |

* cited by examiner

[Fig. 1]
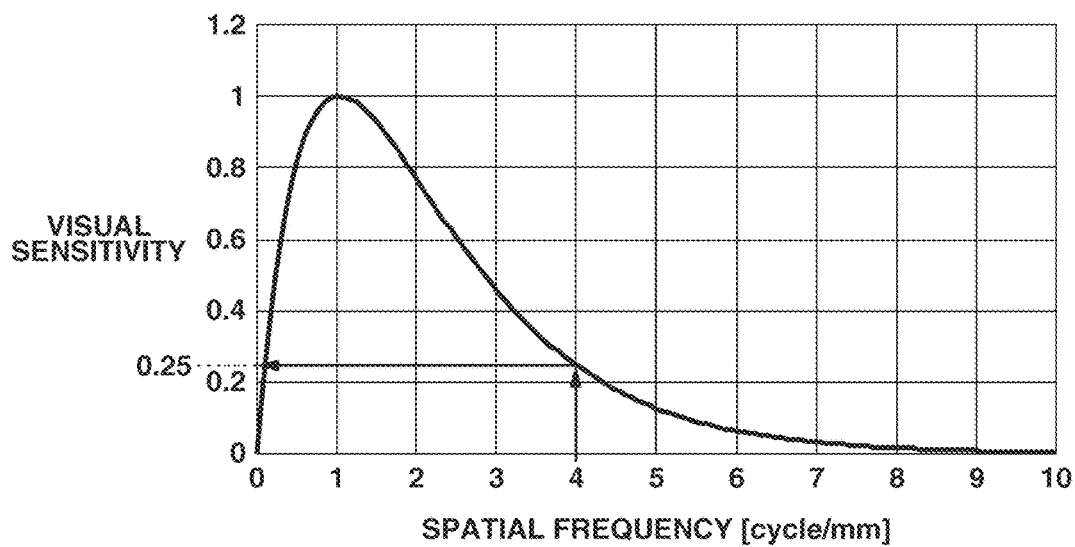
[Fig. 2]
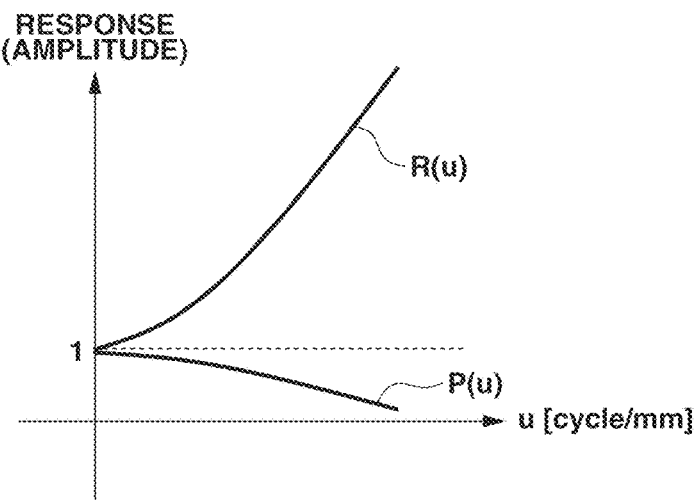

[Fig. 3]
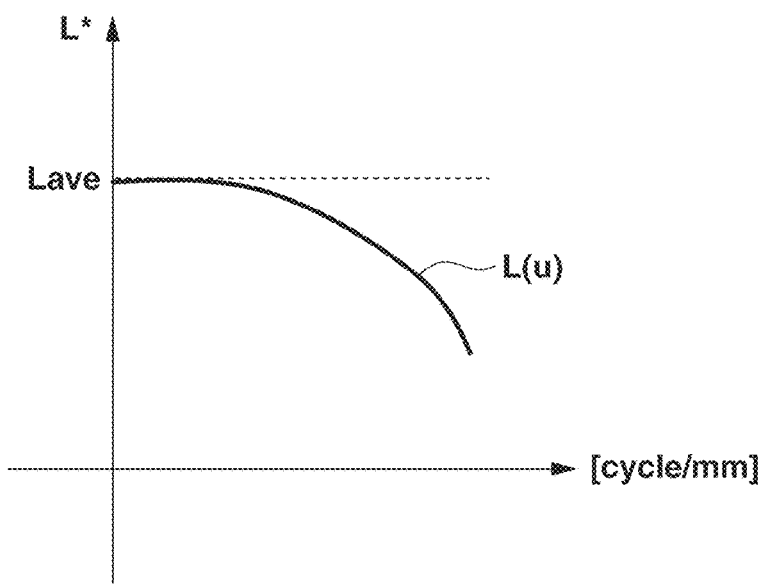
[Fig. 4A]
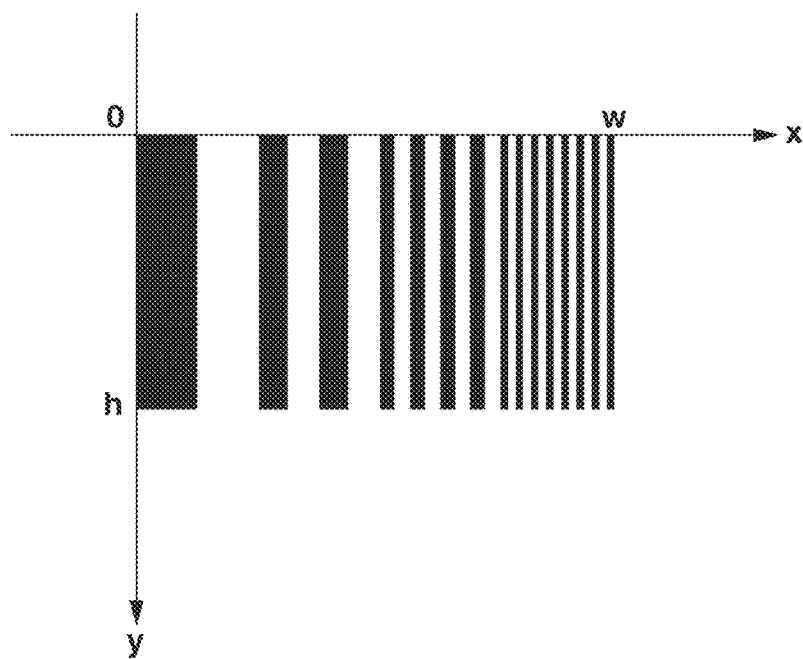

[Fig. 4B]
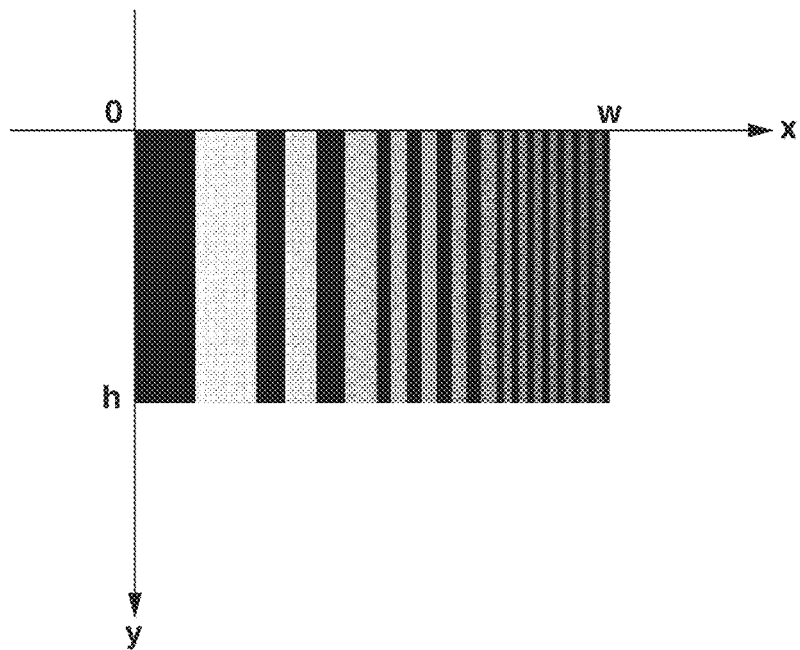
[Fig. 5]
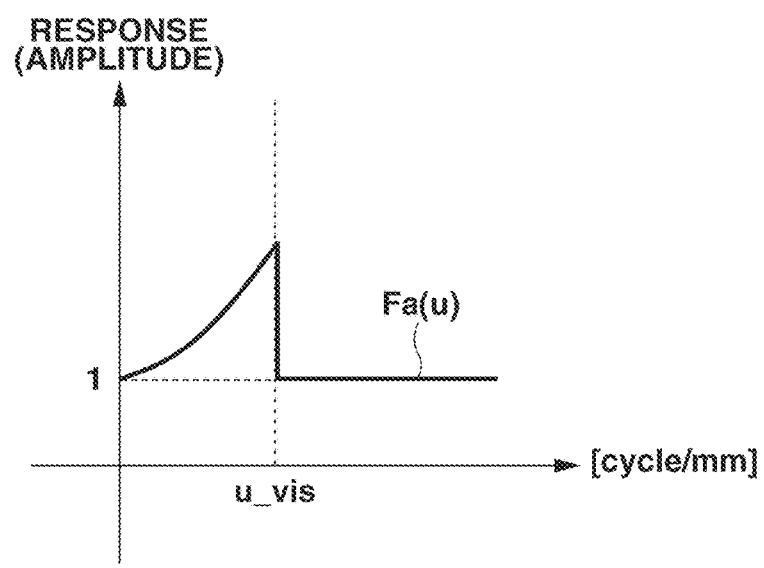

[Fig. 6]
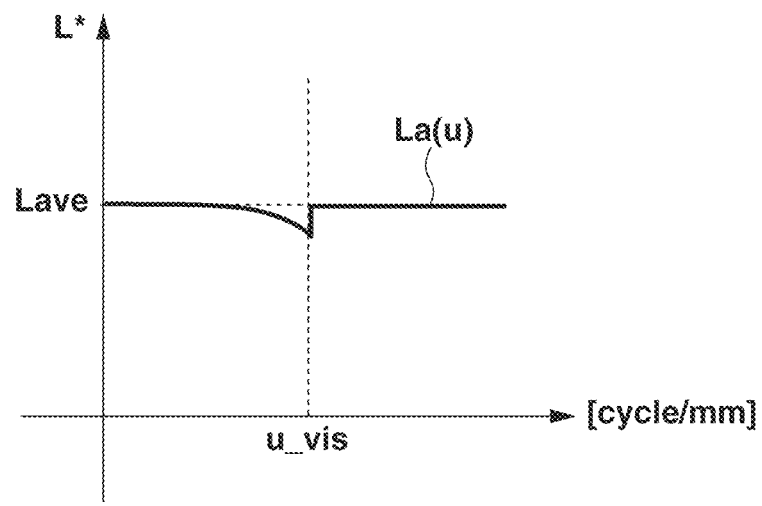
[Fig. 7]
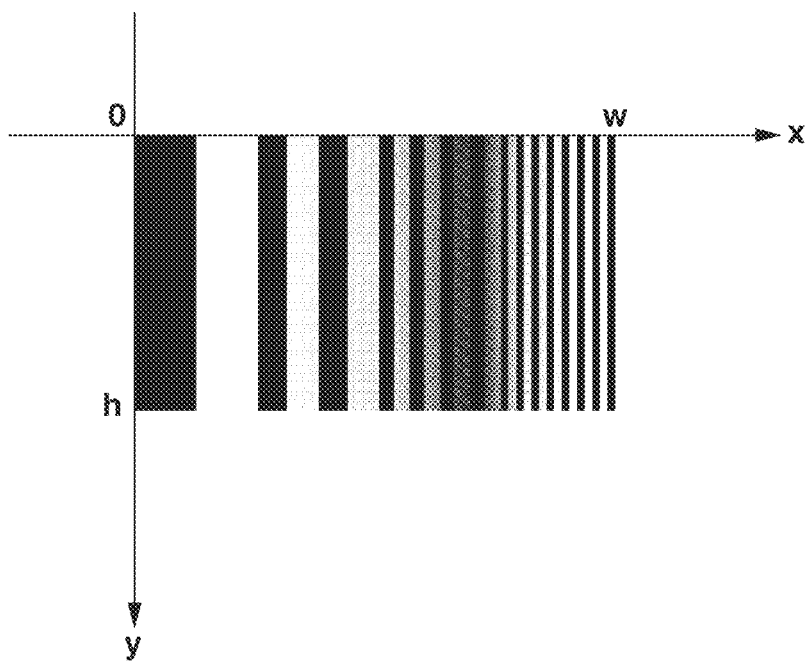

[Fig. 8A]
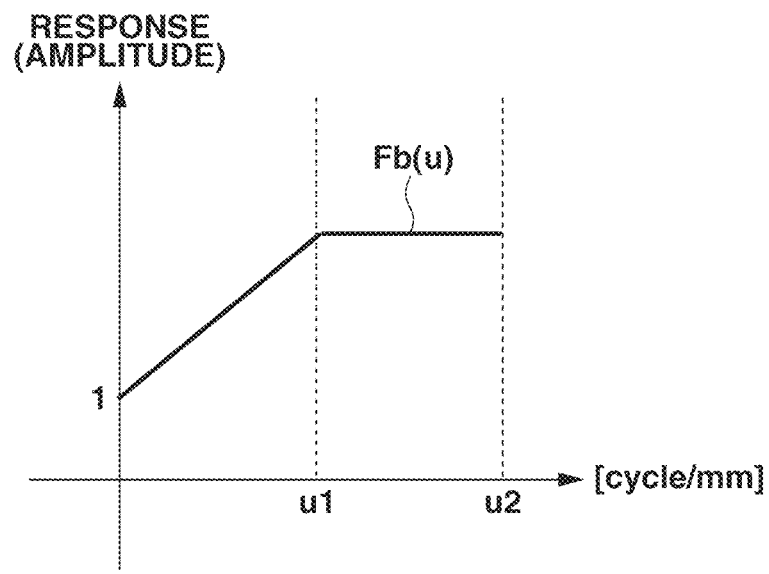
[Fig. 8B]
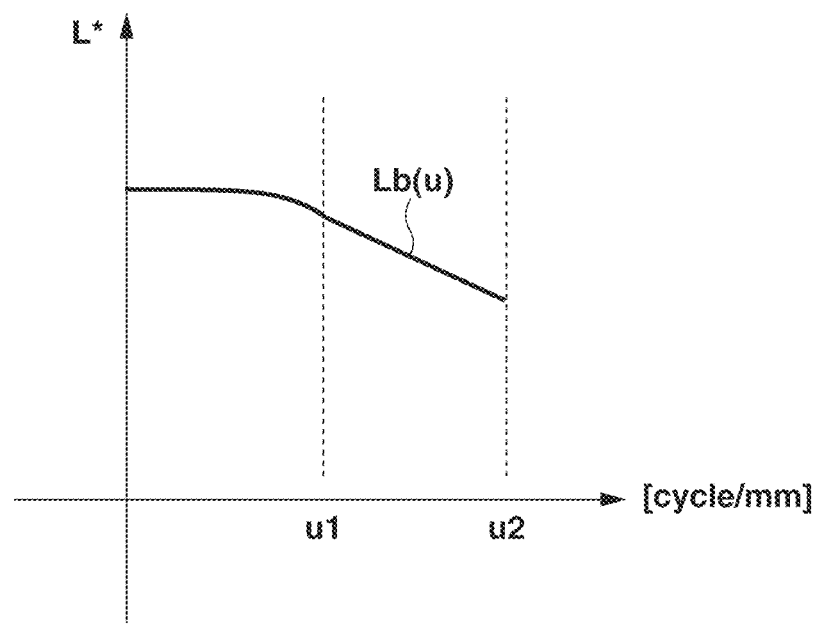

[Fig. 9]
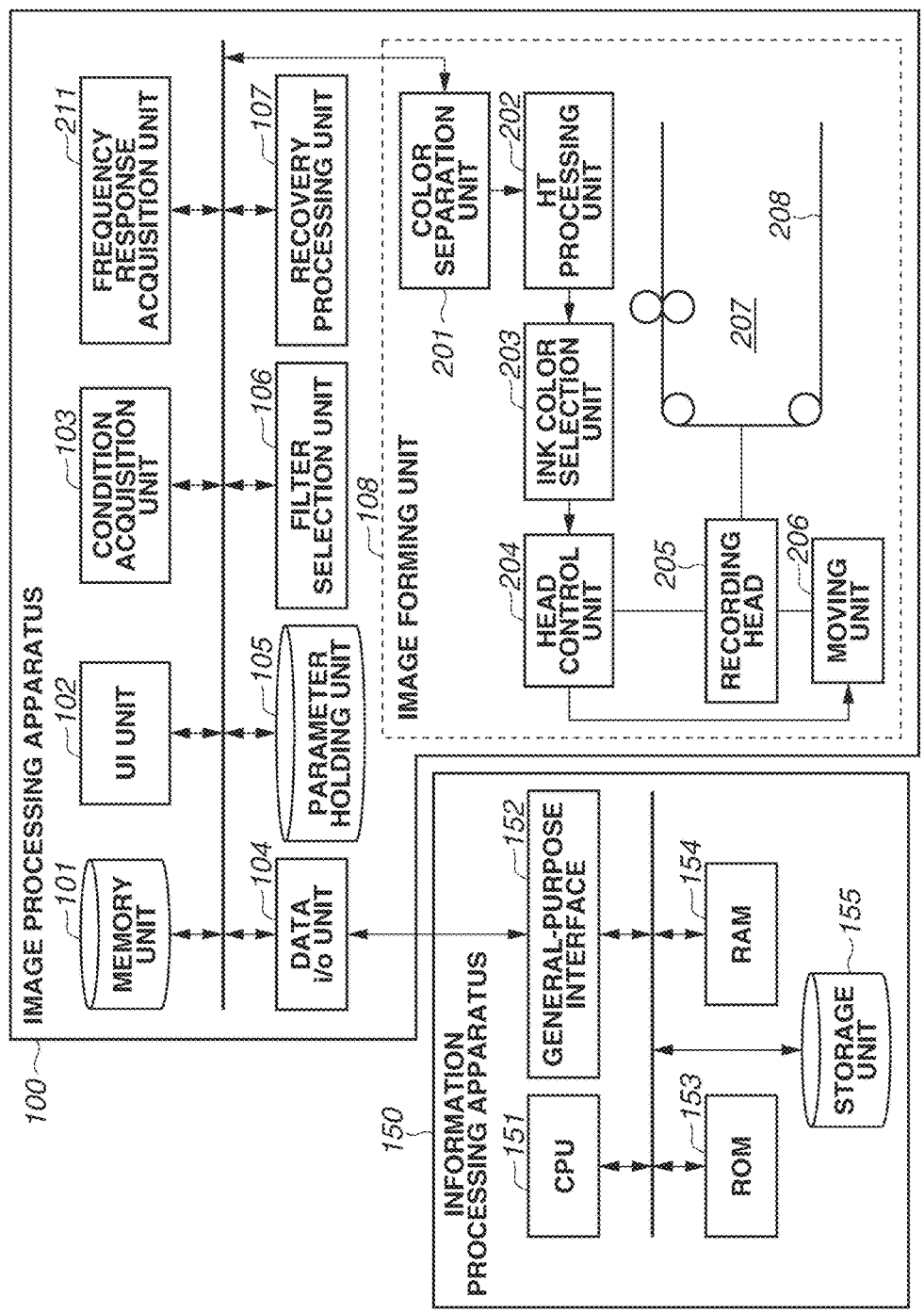

[Fig. 10]
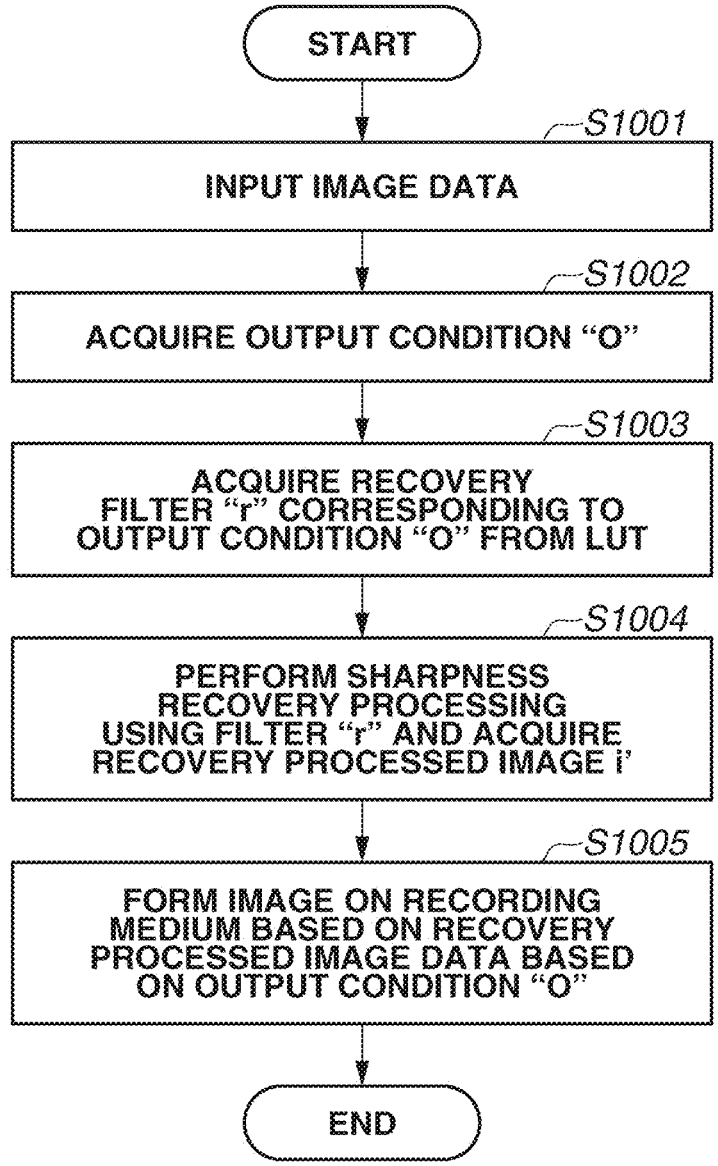

{Fig. 11}

| OUTPUT CONDITION Oi | OUTPUT MEDIUM | NUMBER OF PATHS | CARRIAGE SPEED | PRINT DIRECTION | HT PROCESSING | HEAD-TO-MEDIUM DISTANCE | CLEAR INK | COLOR SETTING | FILTER NUMBER |
|---|---|---|---|---|---|---|---|---|---|
| O1 | A | 16 | SLOW | ONE-WAY | ERROR DIFFUSION | SHORT | NOT USED | COLOR A | 1 |
| O2 | A | 32 | SLOW | ONE-WAY | ERROR DIFFUSION | SHORT | NOT USED | COLOR A | 1 |
| O3 | A | 16 | FAST | ONE-WAY | ERROR DIFFUSION | SHORT | NOT USED | COLOR A | 1 |
| O4 | A | 16 | SLOW | TWO-WAY | ERROR DIFFUSION | SHORT | NOT USED | COLOR A | 1 |
| O5 | A | 16 | SLOW | ONE-WAY | DITHER METHOD | SHORT | NOT USED | COLOR A | 1 |
| Oa | A | 32 | FAST | TWO-WAY | DITHER METHOD | LONG | USED | MONOCHROME 1 | 2 |
| Ob | B | 16 | SLOW | ONE-WAY | ERROR DIFFUSION | SHORT | NOT USED | OFF | 1 |
| Oc | C | 16 | SLOW | ONE-WAY | ERROR DIFFUSION | SHORT | NOT USED | OFF | 3 |

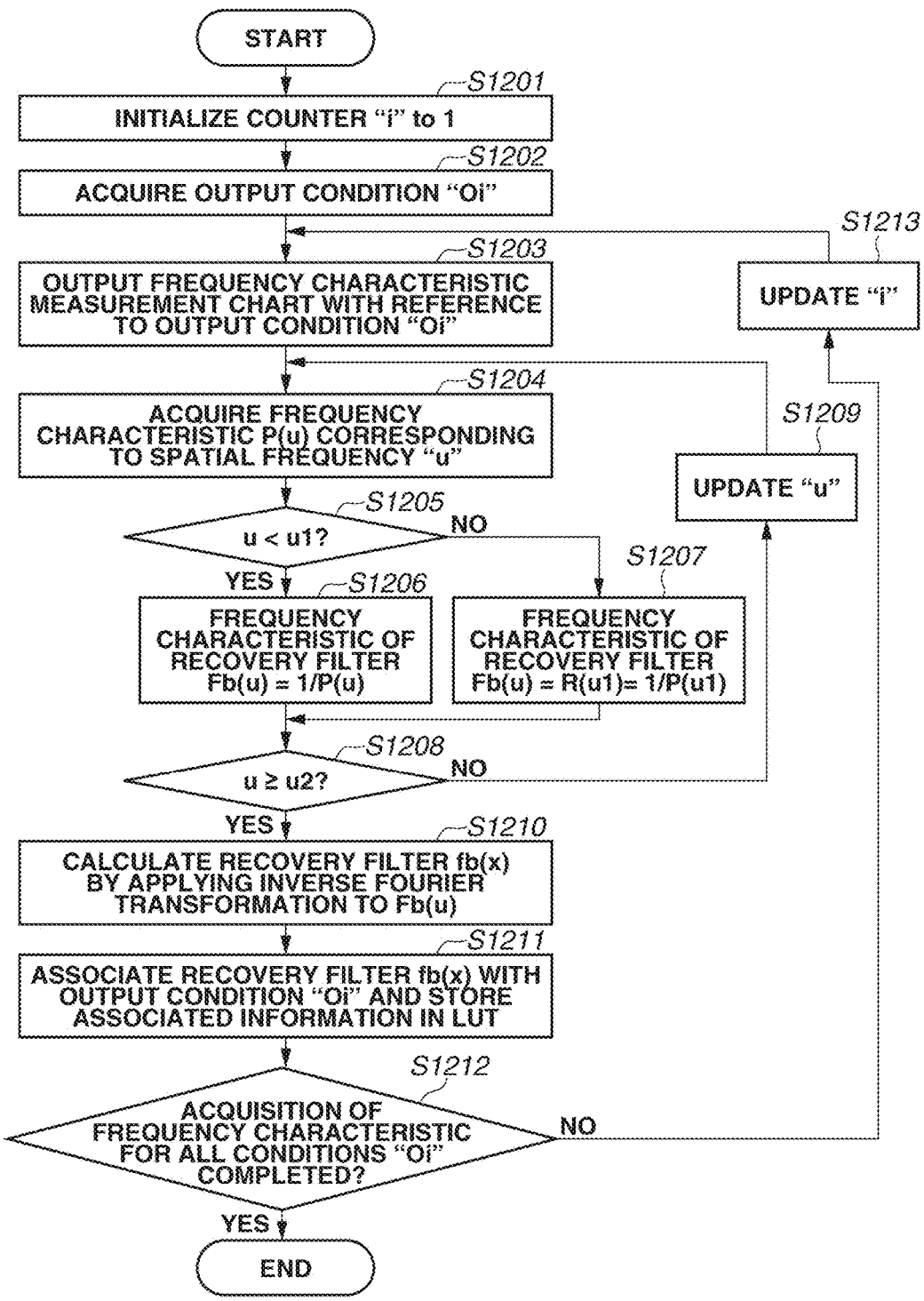
[Fig. 12]

[Fig. 13]
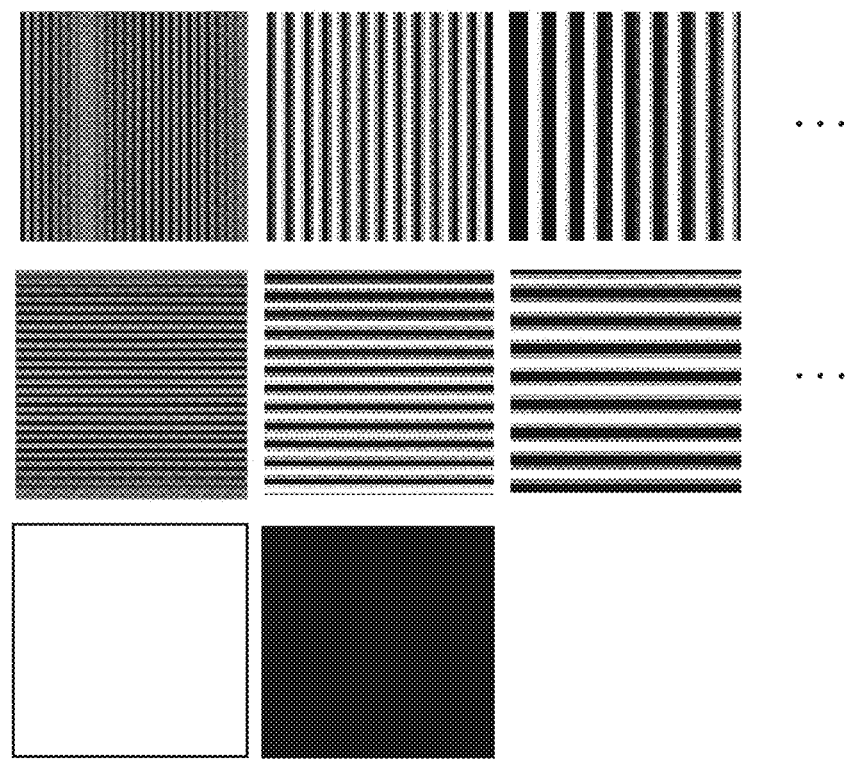

[Fig. 14]

| OUTPUT CONDITION Oi | OUTPUT MEDIUM | NUMBER OF PATHS | CARRIAGE SPEED | PRINT DIRECTION | HT PROCESSING | HEAD-TO-MEDIUM DISTANCE | CLEAR INK | COLOR SETTING | FILTER NUMBER |
|---|---|---|---|---|---|---|---|---|---|
| O1 | A | 16 | SLOW | ONE-WAY | ERROR DIFFUSION | SHORT | NOT USED | COLOR A | |
| O2 | A | 32 | SLOW | ONE-WAY | ERROR DIFFUSION | SHORT | NOT USED | COLOR A | |
| O3 | A | 16 | FAST | ONE-WAY | ERROR DIFFUSION | SHORT | NOT USED | COLOR A | |
| O4 | A | 16 | SLOW | TWO-WAY | ERROR DIFFUSION | SHORT | NOT USED | COLOR A | |
| O5 | A | 16 | SLOW | ONE-WAY | DITHER METHOD | SHORT | NOT USED | | |
| Oa | A | 32 | FAST | TWO-WAY | DITHER METHOD | LONG | USED | MONOCHROME 1 | |
| Ob | B | 16 | SLOW | ONE-WAY | ERROR DIFFUSION | SHORT | NOT USED | OFF | |
| Oc | C | 16 | SLOW | ONE-WAY | ERROR DIFFUSION | SHORT | NOT USED | OFF | |

[Fig. 15A]
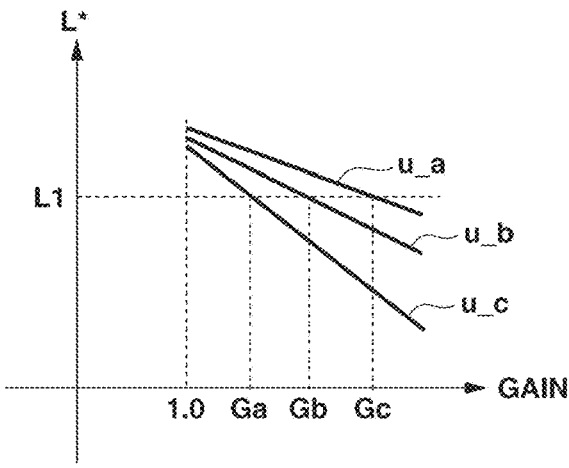
[Fig. 15B]
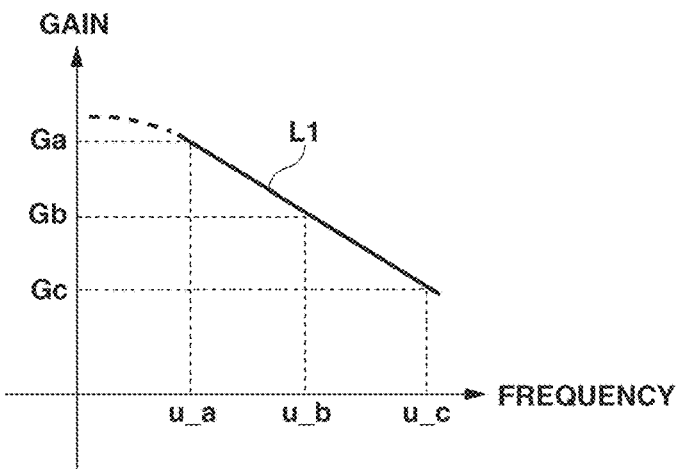
[Fig. 16]
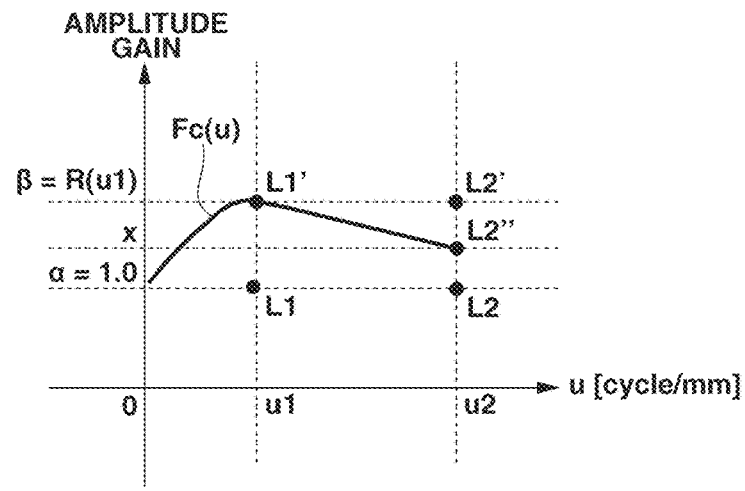

[Fig. 17]
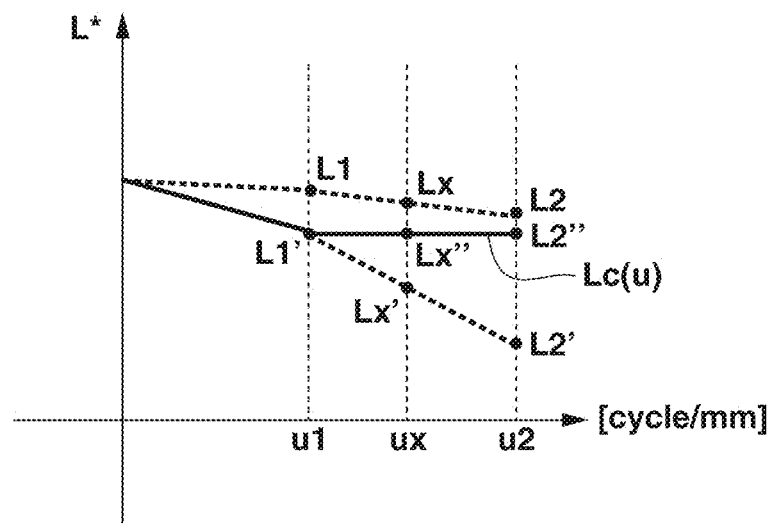
[Fig. 18]
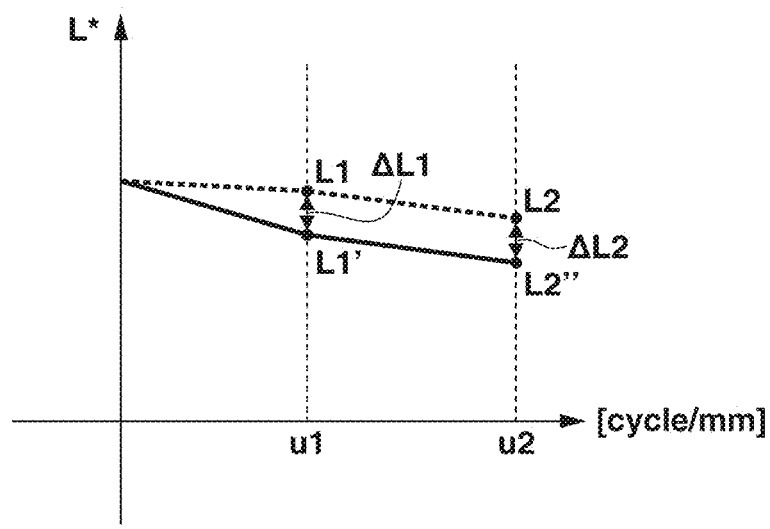

[Fig. 19]
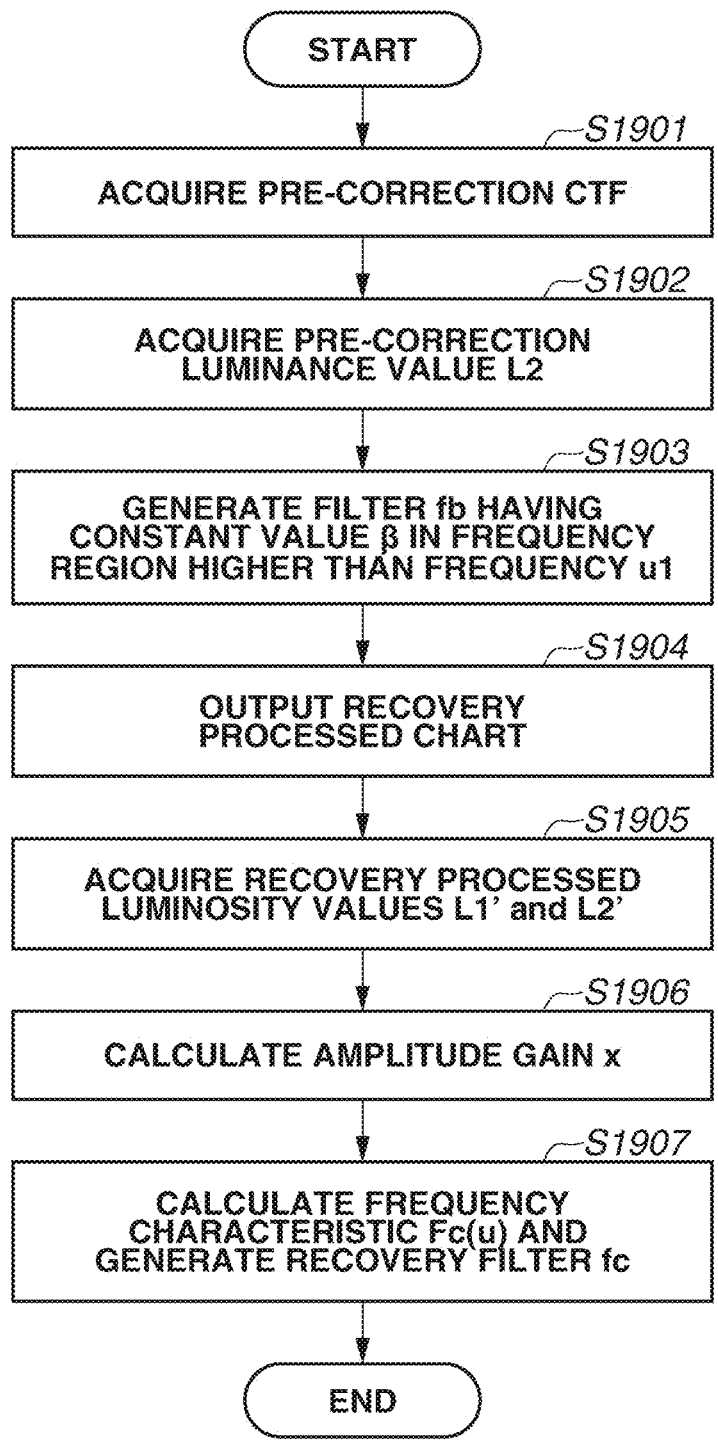

[Fig. 20A]
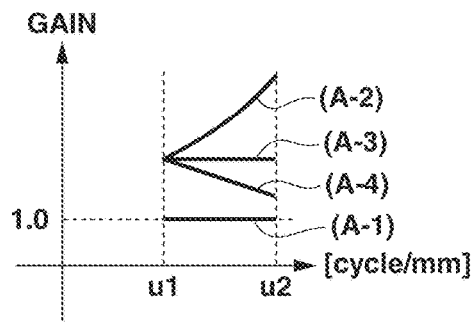
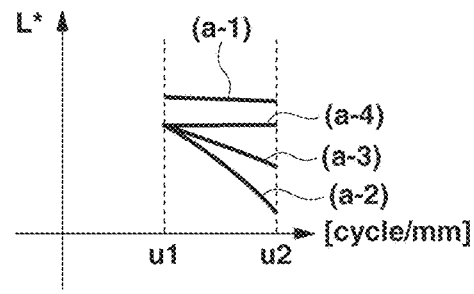
[Fig. 20B]
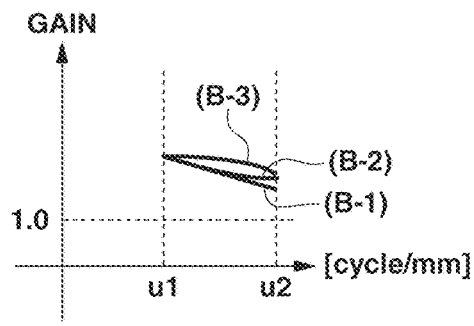
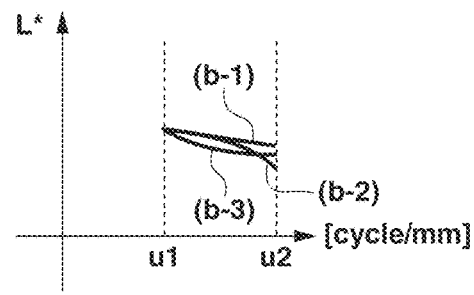
[Fig. 20C]
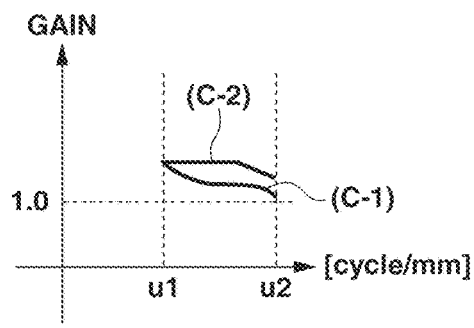
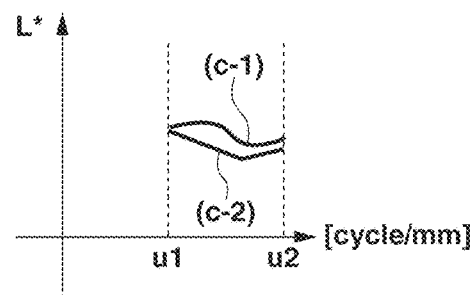

250
IMAGE PROCESSING APPARATUS FOR IMPROVING IMAGE SHARPNESS ACCORDING TO THE OUTPUT CONDITION, IMAGE PROCESSING METHOD AND PROGRAM

TECHNICAL FIELD

The present invention relates to processing capable of recovering sharpness of an image.

BACKGROUND ART

It is conventionally known that an output image of an image forming apparatus (e.g., an inkjet printer) is inferior to a corresponding input image in sharpness because of deviation in ink impact position, bleeding of ink (mechanical dot gain), or optical blur (optical dot gain). In this case, if preliminarily acquiring frequency characteristic of the output image is feasible, the reduction in sharpness can be compensated by applying convolution processing (hereinafter, referred to as "sharpness recovery processing") to the input image with a filter having an inverse characteristic.

However, it is also known that applying the sharpness recovery processing using the filter having the inverse characteristic to an input image of the image forming apparatus (e.g., the inkjet printer) causes a reduction of luminance in a high-frequency region.

According to a conventional technique discussed in PTL 1, the reduction in luminance can be suppressed by preliminarily measuring a luminance change amount before and after sharpness recovery processing and performing correction based on a change amount measured for each pixel of an input image.

Further, a method discussed in PTL 2 includes embedding a delta function in a digital image, processing the digital image through intermediate (e.g., sharpening, printing, and, scanning) processing, and extracting the delta function from the processed image. The method discussed in PTL 2 further includes estimating Modulation Transfer Function (MTF), as frequency characteristic, from the extracted delta function, to perform correction. When the filter used for sharpening (recovery) processing is a Wiener filter, it is feasible to maximize the signal to noise ratio in the sharpening processing by dividing the MTF by a sum of a square of MTF and a square of noise if noise characteristic of an intermediate processing apparatus is known beforehand.

CITATION LIST

Patent Literature

PTL 1: Japanese Patent Application Laid-Open No. 2011-24049
PTL 2: Japanese Patent Application Laid-Open No. 2001-188903

SUMMARY OF INVENTION

Technical Problem

According to the technique discussed in PTL 1, it is necessary to measure and store a luminance change amount corresponding to a feature amount of an image, such as amplitude value or average luminance (brightness) value of each frequency component, preliminarily. Further, it is necessary to calculate the above-mentioned the feature amount for each pixel of the input image in the sharpness recovery processing. Therefore, storage costs, recovery processing measurement costs, and calculation costs increase significantly.

With the technique discussed in PTL 2, the luminance reduction cannot be suppressed because it intends to suppress the frequency characteristic according to the amount of noises.

Solution to Problem

The present invention is directed to a technique for simplifying the sharpness recovery processing capable of preventing the brightness reduction from being perceived.

According to an aspect of the present invention, an image processing apparatus includes an acquisition unit configured to acquire an output condition when an image forming apparatus forms an image on a recording medium based on image data and a processing unit configured to perform image processing on the image data for improving sharpness of the image by using a parameter based on the output condition in such a way as to improve sharpness of the image. The parameter to be referred to by the processing unit represents such a characteristic that the image formed by the image forming apparatus has a luminous characteristic in relation to spatial frequency that remains constant or decreases continuously without causing any inflection point or any discontinuous point in a frequency band from a predetermined frequency to a limit frequency of the image forming apparatus.

According to another aspect of the present invention, an image processing apparatus includes an acquisition unit configured to acquire an output condition when an image forming apparatus forms an image on a recording medium based on image data and a processing unit configured to perform image processing on the image data for improving sharpness of the image by using a parameter based on the output condition in such a way as to improve sharpness of the image. The parameter to be referred to by the processing unit represents such a characteristic that the degree of improvement in sharpness is enhanced in a specific frequency range lower than a predetermined frequency, in spatial frequencies of the formed image, in which contribution to visibility is sufficiently smaller, and that the degree of improvement in the sharpness remains constant or decreases continuously without causing any inflection point or any discontinuous point in a frequency band higher than the predetermined frequency and reaching a limit frequency of the image forming apparatus.

Further features of the present invention will become apparent from the following description of exemplary embodiments with reference to the attached drawings.

BRIEF DESCRIPTION OF DRAWINGS

FIG. 1 is a graph illustrating an example of visual characteristic.
FIG. 2 is a graph illustrating an example of frequency characteristic of an image forming apparatus and inverse characteristic thereof.
FIG. 3 is a graph illustrating an example of luminous characteristic, which is obtained through recovery processing performed with the inverse characteristic.
FIG. 4A illustrates an example of luminance reduction observed when the recovery processing is performed with an inverse characteristic on an input image whose frequency changes smoothly with respect to a changing spatial position.

FIG. 4B illustrates an example of luminance reduction observed when the recovery processing is performed with an inverse characteristic on an input image whose frequency changes smoothly with respect to a changing spatial position.

FIG. 5 is a graph illustrating an example of frequency characteristic Fa(u).

FIG. 6 is a graph illustrating an example of luminous characteristic La(u), which can be obtained through recovery processing performed with the frequency characteristic Fa(u).

FIG. 7 illustrates an example of luminance reduction observed when the input image illustrated in FIG. 4A is subjected to recovery processing performed with the frequency characteristic Fa(u).

FIG. 8A illustrates an example of frequency characteristic Fb(u).

FIG. 8B illustrates an example of luminous characteristic Lb(u), which can be obtained through recovery processing performed with the frequency characteristic Fb(u).

FIG. 9 is a block diagram illustrating an example of a configuration of an image processing apparatus according to a first exemplary embodiment.

FIG. 10 is a flowchart illustrating an example of a processing flow according to the first exemplary embodiment.

FIG. 11 illustrates an example of cooperation LUT.

FIG. 12 is a flowchart illustrating an example of a recovery filter and cooperation LUT generation flow.

FIG. 13 illustrates an example of a sharpness measurement chart.

FIG. 14 illustrates an example of cooperation LUT, in which a "filter number" column is blank.

FIG. 15A illustrates an example of changes in luminance relative to filter frequency characteristics at frequencies u_a, u_b, and u_c.

FIG. 15B illustrates an example of changes in luminance relative to filter frequency characteristics at frequencies u_a, u_b, and u_c.

FIG. 16 is a graph illustrating an example of frequency characteristic Fc(u).

FIG. 17 is a graph illustrating luminous characteristic Lc(u), which can be obtained through recovery processing performed with the frequency characteristic Fc(u).

FIG. 18 is a graph illustrating an example of luminous characteristic in which a difference in luminance before and after recovery processing is substantially identical at frequencies u1 and u2.

FIG. 19 is a flowchart illustrating an example of a recovery filter generation flow according to a second exemplary embodiment.

FIG. 20A illustrates a modified example according to the second exemplary embodiment.

FIG. 20B illustrates a modified example according to the second exemplary embodiment.

FIG. 20C illustrates a modified example according to the second exemplary embodiment.

DESCRIPTION OF EMBODIMENTS

Hereinafter, exemplary embodiments of the present invention will be described in detail below with reference to the attached drawings. The following exemplary embodiments do not intend to limit the present invention narrowly.

Further, all combinations of characteristic features described in the following exemplary embodiments are not always necessary as solving means of the present invention. In the following description, similar constituent components are denoted by the same reference numerals.

First Exemplary Embodiment

FIG. 1 illustrates a visual characteristic calculated according to a known method (Dooley's approximate expression), in which the observation distance is 300 mm. As apparent from FIG. 1, the human visual sensitivity characteristic (hereinafter, referred to as "visual characteristic") decreases with increasing spatial frequency. For example, the visual sensitivity is not higher than 0.25 in a spatial frequency region (hereinafter, referred to as "frequency region") exceeding 4 cycle/mm. If a reduction in sharpness occurs in such a region, recognizing the reduction is difficult. In the following description, the spatial frequency (e.g., 4 cycle/mm) at which the above-mentioned sharpness reduction recognition becomes difficult is referred to as "visual limit frequency". Further, in the following description, the spatial frequency may be simply referred to as "frequency".

Further, in the following exemplary embodiment, frequency characteristic of brightness L* included in CIE Lab will be described as the luminous characteristic. Alternatively, for example, the Y characteristic of XYZ color specification system can be used as the luminous characteristic. Alternatively, the optical density characteristic on paper can be used as the luminous characteristic.

<Luminance Reduction by Sharpness Recovery Processing>

If frequency characteristic P(u) of an output image can be acquired beforehand, compensating sharpness reduction of the output image is feasible by performing sharpness recovery processing on an input image with a filter having inverse characteristic R(u)=1/P(u). For example, when a curve P(u) illustrated in FIG. 2 represents the frequency characteristic P(u) of the output image, another curve R(u) illustrated in FIG. 2 represents the inverse characteristic 1/P(u). In this case, a sharpness reduction suppressed image can be obtained by outputting an image subjected to sharpness recovery processing performed with a filter that can be obtained by applying inverse Fourier transformation to the inverse characteristic R(u).

However, if the filter having the inverse characteristic is used to perform the sharpness recovery processing on an input image of an image forming apparatus, average luminance decreases in a high-frequency region. A curve L(u) illustrated in FIG. 3 represents an example of the luminance reduction observed when the recovery processing is performed with the inverse characteristic R(u). The curve L(u) is average luminance of an output image at frequency u when an input image is sine wave having an amplitude of average brightness Lave at the frequency u.

As illustrated in FIG. 3, when the sharpness recovery processing is performed with the inverse characteristic R(u), the luminance decreases monotonously with increasing frequency u. For example, when the sharpness recovery processing is performed with the inverse characteristic R(u) on an input image whose frequency changes smoothly according to a changing spatial position, the luminance reduction occurs according to the spatial position. The above-mentioned phenomenon will be described in detail below with reference to FIGS. 4A and 4B. FIG. 4A illustrates an example of an image whose sine wave spatial frequency u_changes linearly with respect to the changing spatial position×[mm]. More specifically, the pixel position corresponds to the spatial frequency. In the illustrated image, the frequency is lower at a left region thereof and higher at a right region thereof. The following formula (1) is usable to generate such an image.

$$I(x, y) = Lh \times \sin(\pi \times x^2/w) + Lave \quad (1)$$

In the formula (1), x satisfies a condition $0 <= x < w$, $I(x, y)$ represents pixel values at coordinates (x, y), w [mm] represents the horizontal width of the image, Lh represents the amplitude of sine wave, Lave represents average brightness, and π represents the ratio of the circumference of a circle to its diameter. In this case, the relationship between the position x and the spatial frequency u_can be expressed by using an equation u=A×x, in which A represents a constant of proportionality. In this case, if u_max represents the maximum resolution (dpi) that the image forming apparatus can realize, and when the constant of proportionality A at the position x and the spatial frequency u is (u_max/(2×25.4× w)), the image illustrated in FIG. 4A ranging from a low frequency to the maximum resolution realized by the image forming apparatus can be obtained. If the recovery processing is performed on the input image illustrated in FIG. 4A with the inverse characteristic R(u) illustrated in FIG. 2B, average luminous characteristic L(u) of the output image becomes L(A×x). Accordingly, when L(u) is the characteristic illustrated in FIG. 3, the luminance reduction increases when the value x becomes larger. FIG. 4B illustrates an output image obtained in this case.

The reduction of luminance illustrated in FIG. 4B occurs due to the sharpness recovery processing that enlarges the amplitude of high-frequency components. Therefore, the luminance reduction can be prevented from being perceived by suppressing the frequency characteristic in a high-frequency region of a filter to be used for the recovery processing. For example, if the frequency characteristic Fa(u) of the filter to be used in the sharpness recovery processing is fixed to 1.0 in the high-frequency region, it will be feasible to prevent the amplitude from being excessively increasing in the higher-frequency region. The sharpness recovery processing will be performed without causing undesirable reduction in luminance. However, fixing the frequency characteristic Fa(u) to 1.0 in the high-frequency region brings an adverse effect such that the sharpness recovery is not satisfactory in the high-frequency region. Therefore, in a frequency region lower than the visual limit frequency at which recognizing the sharpness reduction becomes difficult, it is desired to prioritize the effect of the sharpness recovery over the suppression of sharpness recovery characteristic. On the other hand, in a frequency region higher than the visual limit frequency, it is desired to suppress the sharpness recovery characteristic in such a way as to prevent the luminance from reducing. More specifically, the luminance reduction occurs due to enlargement of amplitude in the recovery processing. Therefore, suppressing the luminance reduction at lower costs is feasible by performing the recovery processing with a filter whose frequency characteristic is adequately suppressed in a high-frequency region. Therefore, for example, it is useful to perform the sharpness recovery processing with frequency characteristic Fa(u) illustrated in FIG. 5, in which u_vis represents the visual limit frequency. The frequency characteristic Fa(u) can be defined by the following formula (2).

$$Fa(u) = R(u) \ (0 <= u < u\_vis) = 1.0 \ (u\_vis <= u < u\_max) \quad (2)$$

Using the sharpness recovery filter having the frequency characteristic Fa(u) brings an effect of suppressing the reduction in luminance while adequately maintaining the effects obtainable by the filter in a visually important region.

More specifically, in the design of a filter, it is useful to apply inverse Fourier transformation to the frequency characteristic Fa(u). It is unnecessary to measure the luminance change amount according to the feature amount (e.g., amplitude value or average luminance (brightness) value of each frequency component) of an image. Further, the sharpness recovery processing can be similar to the processing performed with an ordinary sharpness recovery filter and does not require to calculate the feature amount (e.g., amplitude value or average luminance (brightness) value of each frequency component) for each input pixel. Accordingly, suppressing the luminance reduction in the sharpness recovery processing can be realized without increasing measurement costs and calculation costs.

However, if the frequency characteristic Fa(u) is used in the sharpness recovery processing, the luminous characteristic has a discontinuous shape protruding downward like a characteristic La(u) illustrated in FIG. 6. Therefore, if the sharpness recovery processing is performed with the frequency characteristic Fa(u) on the input image whose frequency smoothly changes with respect to the changing spatial position (see FIG. 4A), a belt-like unnatural luminance variation illustrated in FIG. 7 will be perceived. Such an unnatural luminance variation causes excessive deterioration in the image quality of an output image obtained through the sharpness recovery processing. Accordingly, controlling the output image in such a way as to prevent the luminance variation from being perceived becomes necessary.

The present exemplary embodiment intends to realize sharpness recovery processing capable of preventing the luminance variation from being perceived. To this end, the frequency characteristic (e.g., amplitude gain) of a filter to be used in the sharpness recovery processing is set to be a fixed value in a frequency region exceeding a predetermined frequency u1.

For example, as indicated by the following formula (3), the sharpness recovery characteristic (i.e., the amplitude gain) of the filter is not suppressed, to prioritize the effect of the sharpness recovery in a frequency band lower than the frequency u1, and the sharpness recovery characteristic is fixed to R(u1) in a frequency band higher than the frequency u1 to suppress the luminosity reduction. Such a filter configuration brings an effect of realizing sharpness recovery processing capable of preventing the luminance variation from being perceived.

$$Fb(u) = R(u) \ (0 <= u < u1) = R(u1) \ (u1 <= u) \quad (3)$$

The above-mentioned filter configuration will be described in detail below with reference to the attached drawings. FIG. 8A illustrates the filter characteristic Fb(u) defined by the formula (3). The filter characteristic Fb(u) is constant in the frequency region between u1 and u2. An experimental result reveals that luminance Lb(u) obtained through the sharpness recovery processing using the filter characteristic Fb(u) decreases linearly in the frequency region between u1 and u2. FIG. 8B illustrates the luminance Lb(u) obtained in this case.

As understood from the frequency characteristic P(u) illustrated FIG. 2, an output image formed by a general image forming apparatus has a frequency characteristic, i.e., amplitude gain that decreases with increasing frequency. Accordingly, the inverse characteristic R(u) becomes larger correspondingly (see FIG. 2). As a result, the amount of luminance reduction increases. In view of the foregoing, to suppress the luminance reduction, it is useful to fix the frequency characteristic (i.e., the amplitude gain) of the sharpness recovery filter in the frequency band higher than the frequency u1 as illustrated in FIG. 8A. More specifically, if the frequency characteristic employed for the sharpness recovery processing is the filter characteristic Fb(u), it is feasible to prevent the luminance from decreasing in the frequency band higher than frequency u1. In this case, the luminance Lb(u) obtained through the recovery processing decreases substantially linearly with increasing frequency in the frequency region between u1 and u2, as illustrated in FIG. 8B. Therefore, the unnatural luminance variation illustrated in FIG. 7 does not occur when the sharpness recovery processing is performed. If the frequency u1 is the visual limit frequency u_vis and the frequency u2 is the output resolution u_max of the image forming apparatus, using the filter characteristic Fb(u) can prevent the luminance variation from being perceived in the sharpness recovery processing.

(Apparatus Configuration and Processing Flow)

FIG. 9 is a block diagram illustrating a configuration of an image processing apparatus 100 according to the present exemplary embodiment. FIG. 10 is a flowchart illustrating processing that can be performed by the image processing apparatus 100 according to the present exemplary embodiment. Hereinafter, the processing that can be performed by the image processing apparatus 100 will be schematically described with reference to the block diagram of FIG. 9 and the flowchart of FIG. 10.

First, in step S1001, a recovery processing unit 107 acquires image data "i" of an image formation target from an information processing apparatus 150, via a data input and output (i/o) unit 104. Further, the recovery processing unit 107 stores the acquired image data "i", for example, in a memory unit 101 (e.g., a random access memory (RAM)).

Next, in step S1002, a condition acquisition unit 103 acquires an output condition "O" of an image forming unit 108 via a user interface (UI) unit 102 or from the information processing apparatus 150. The output condition "O" includes information about the number of paths, carriage speed, print direction (two-way or one-way), halftone setting, distance between print head and recording medium, usage of clear ink, color setting, necessity of silent setting, and recording medium type. In the present exemplary embodiment, the clear ink (hereinafter, referred to as "CL ink") is a colorless and transparent pigment ink or a substantially colorless and transparent pigment ink.

Next, in step S1003, a filter selection unit 106 accesses a parameter holding unit 105 and acquires a sharpness recovery filter "r" that can satisfy the output condition "O". An example configuration of the sharpness recovery filter and a correspondence relationship between the output condition "O" and the sharpness recovery filter "r" will be described in detail below.

Next, in step S1004, the sharpness recovery processing unit 107 performs sharpness recovery processing using the sharpness recovery filter "r" on the input image data "i" and stores image data "i" acquired through the sharpness recovery processing in the memory unit 101. Then, in step S1005, the image forming unit 108 forms an image on a recording medium 208 based on the image data "i" acquired through the sharpness recovery processing according to the output condition "O".

<Image Forming Unit>

The image forming unit 108 includes a color separation unit 201 that can perform color separation with reference to a color separation table. For example, the color separation unit 201 can separate the image data "i'" composed of RGB color data into color material data corresponding to respective ink cartridges (including a CL ink cartridge) installed on the image forming unit 108. A halftone (HT) processing unit 202 can quantize the color material data output from the color separation unit 201 and convert the quantized data into a dot pattern. The halftone processing unit 202 can output the dot pattern as recording data (hereinafter, referred to as HT data).

The image forming unit 108 is, for example, a thermal transfer type or inkjet type recording apparatus. The image forming unit 108 includes a recording head 205 that is movable in both horizontal and vertical directions relative to the recording medium 208, so that an image represented by the HT data to be input on a band-to-band basis can be formed on the recording medium 208. In this case, an ink color selection unit 203 selects an ink color corresponding to the input HT data from the ink color cartridges mounted on the recording head 205.

The recording head 205 includes at least one recording element (e.g., a nozzle of the inkjet type image forming unit). To realize the above-mentioned horizontal and vertical relative movements of the recording head 205, a head control unit 204 can control a moving unit 206 in such a way as to move the recording head 205 in an X direction (i.e., a main scanning direction). Further, the head control unit 204 can control a conveyance unit 207 in such a way as to convey the recording medium 208 in a Y direction (i.e., a sub scanning direction).

<Parameter Holding Unit>

The parameter holding unit 105 can be constituted by a nonvolatile memory, such as an Electrically Erasable Programmable Read-Only Memory (EEPROM) or a flash memory. The parameter holding unit 105 holds a look-up table (hereinafter, referred to as "correspondence LUT") that indicates a correspondence relationship between a combination of the above-mentioned various output conditions and a corresponding sharpness recovery filter. FIG. 11 illustrates an example of the correspondence LUT. An exemplary method for generating a sharpness recovery filter corresponding to output conditions will be described in detail below.

<Information Processing Apparatus>

The image processing apparatus 100 is connected to the information processing apparatus 150 (e.g., a personal computer). A serial bus (e.g., USB) and a wired or wireless network can be used to connect the image processing apparatus 100 and the information processing apparatus 150.

The information processing apparatus 150 includes a central processing unit (CPU) 151 that can use a random access memory (RAM) 154 as a work memory to execute an operating system (OS) and various programs loaded from a read only memory (ROM) 153 or a storage unit 155. Thus, the CPU 151 can control various operations to be performed by the information processing apparatus 150. The storage unit 155 can be constituted by a hard disk drive (HDD) or a solid state drive (SSD). For example, the storage unit 155 stores printer drivers, the above-mentioned correspondence LUT, and a sharpness recovery filter generation program. When the CPU 151 executes a printer driver, the CPU 151 supplies image data to the image processing apparatus 100 via a general-purpose interface 152 (e.g., USB) or the wired or wireless network. Further, when the CPU 151 executes the generation program to generate a correspondence LUT or a corresponding recovery filter, the generated LUT and the filter can be held in the parameter holding unit 105 via the general-purpose interface 152 or the wired or wireless network.

Further, in a case where the image processing apparatus 100 is a multi-function peripheral equipped with a scanner, a CPU (not illustrated) of the image processing apparatus 100 can be configured to execute the generation program to generate the correspondence LUT and the sharpness recovery filter.

<Generation of Sharpness Recovery Filter and Correspondence LUT>

An example procedure for generating a sharpness recovery filter and a cooperation correspondence LUT will be described in detail below with reference to a flowchart illustrated in FIG. 12.

In step S1201, the CPU 151 initializes a counter "i" to "1". In step S1202, the CPU 151 acquires an output condition "Oi" to generate a sharpness recovery filter corresponding to the counter "i". For example, the CPU 151 acquires the output condition "OI" illustrated in FIG. 11, which includes information about recording medium "A", number of paths "16", carriage speed "slow", print direction "one way", HT processing "error diffusion", head-to-medium distance "short", clear ink "not used", and color setting "color A".

Next, in step S1203, the CPU 151 controls the image forming unit 108 to output a sharpness measurement chart with reference to the output condition "Oi". The CPU 151 does not perform the recovery processing during the output of the measurement chart. FIG. 13 illustrates an example of the measurement chart. The measurement chart is an image chart including a plurality of sine wave patterns differentiated in frequency and uniform patterns (e.g., solid white and solid black) positioned at a lower light portion.

Next, the CPU 151 acquires information required to acquire the frequency characteristic from the measurement chart by using a measurement apparatus (not illustrated) connected to the general-purpose interface 152. The measurement apparatus is, for example, a scanner, a digital camera, a microscope, or a microdensitometer. In step S1204, the CPU 151 calculates a frequency response value P(u) of the image forming apparatus corresponding to the output condition "Oi" based on the acquired information.

An optical transfer function (MTF), which can be calculated using the following formula, is sable as the frequency response value P(u).

$$P(u)=C(u)/C' \qquad (4)$$

In the formula (4), "u" represents the frequency of sine wave.

$$C(u)=\{Max(u)-Min(u)\}/\{Max(u)+Min(u)\}$$

$$C'=(White-Black)/(White+Black)$$

Max(u) represents maximum brightness of the sine wave pattern that is variable according to the frequency u, Min(u) represents minimum brightness of the sine wave pattern that is variable according to the frequency u, White represents brightness of the uniform white pattern, and Black represents brightness of the uniform black pattern.

The formula for calculating the optical transfer function is not limited to the formula (4). For example, the following formula can be used in the above-mentioned calculation.

$$P(u)=\{Max(u)-Min(u)\}/(White-Black) \qquad (4')$$

The above-mentioned formulas include Max(u), Min(u), White, and Black as brightness values to be referred to in calculating the frequency response value P(u). However, similar calculations can be implemented, for example, by using luminance values, density values, or device RGB values of the measurement apparatus.

Further, the sine wave patterns constituting the measurement chart illustrated in FIG. 13 to output in step S1203 can be replaced by rectangular wave patterns to acquire the frequency characteristic P(u). In this case, contrast transfer function (CTF) values calculated by applying the formula (4) to the rectangular wave patterns are usable for the frequency characteristic P(u). Alternatively, MTF values obtainable by converting the CTF values according to the Coltman correction formula are usable for the frequency characteristic P(u).

Next, the CPU 151 calculates the frequency characteristic Fb(u) of the sharpness recovery filter based on the spatial frequency characteristic P(u) acquired in step S1204. In this case, to generate the sharpness recovery filter according to the above-mentioned formula (3), first in step S1205, the CPU 151 compares u with u1. If the comparison result reveals that a relationship u<u1 is satisfied (YES in step S1205), then in step S1206, the CPU 151 calculates a frequency characteristic Fb(u) with reference to the relationship Fb(u)=R(u)=1/P(u). Further, if the comparison result in step S1205 reveals that a relationship u>=u1 is satisfied (NO in step S1205), then in step S1207, the CPU 151 calculates a frequency characteristic Fb(u) with reference to the relationship Fb(u)=R(u1)=1/P(u1).

Next, in step S1208, the CPU 151 compares the resolution u with the frequency u2 to determine whether the spatial frequency characteristic P(u) has been acquired in the frequency band lower than the output resolution of the image forming apparatus. If the comparison result reveals that a relationship u<u2 is satisfied, namely when the CPU 151 determines that the acquisition of the spatial frequency characteristic P(u) in the frequency band lower than the output resolution is not yet completed (No in step S1208), the operation proceeds to step S1209. In step S1209, the CPU 151 updates the resolution u and then continues the above-mentioned calculation of the frequency characteristic Fb(u) of the sharpness recovery filter. If the comparison result reveals that a relationship u>=u2 is satisfied (Yes in step S1208), the CPU 151 determines that the calculation of the frequency characteristic Fb(u) of the sharpness recovery filter corresponding to the output condition "Oi" has been completed. Then, in step S1210, the CPU 151 calculates a sharpness recovery filter coefficient fb(x) by applying inverse Fourier transformation to the frequency characteristic Fb(u).

Next, in step S1211, the CPU 151 associates the sharpness recovery filter coefficient fb(x) with the output condition "Oi" and stores the associated information in the parameter holding unit 105. In this case, the CPU 151 generates a correspondence LUT in which the output condition "Oi" is associated with the sharpness recovery filter.

For example, a correspondence LUT illustrated in FIG. 14 that includes the column of filter number being initially blanked is stored beforehand in the parameter holding unit 105. The CPU 151 can write a filter number obtained by adding "1" to the largest filter number of the filter numbers stored in the correspondence LUT, as a new filter number r, in a row corresponding to the output condition "Oi". In this case, the CPU 151 can store the calculated coefficient of the sharpness recovery filter in association with the filter number r.

Next, in step S1212, the CPU 151 determines whether the acquisition of the frequency characteristic of the sharpness recovery filter for all output conditions has been completed. If it is determined that there is an output condition that is not yet subjected to the above-mentioned acquisition of the frequency characteristic (NO in step S1212), then in step S1213, the CPU 151 increments the counter "i". Then, the operation returns to step S1203. The CPU 151 allocates a filter number to the next output condition. On the other hand, if it is determined that the acquisition of the frequency characteristic for all output conditions of the sharpness recovery filter has been completed (YES in step S1212), the CPU 151 terminates the processing of the flowchart illustrated in FIG. 12.

In the above-mentioned example, the CPU 151 accesses the parameter holding unit 105 and performs processing for registering the filter number in the correspondence LUT. However, the CPU 151 can acquire a correspondence LUT from the parameter holding unit 105, the storage unit 155, or a server apparatus (not illustrated), in which the filter number is not yet registered, and, after completing the filter number registration processing, store the registration completed correspondence LUT in the parameter holding unit 105.

However, it is not always necessary to prepare a unique sharpness recovery filter for each output condition. The same filter may be allocated to a plurality of output conditions as illustrated in FIG. 11.

As mentioned above, according to the present exemplary embodiment, the frequency characteristic Fb(u) prioritizes the effect of the sharpness recovery over the suppression of frequency characteristic (e.g., amplitude gain) of the sharpness recovery in the frequency band lower than the frequency u1. On the other hand, the frequency characteristic Fb(u) prioritizes the suppression of luminance reduction in the frequency band higher than the frequency u1. To this end, the frequency characteristic (e.g., amplitude gain) of the sharpness recovery is fixed to R(u1). Using the filter coefficient fb that can be obtained by applying inverse Fourier transformation to the frequency characteristic Fb(u) brings an effect of sufficiently suppressing luminance reduction in the frequency band higher than the frequency u1, compared to the sharpness recovery processing using the inverse characteristic R(u). Further, in this case, the luminance Lb(u) obtained through the sharpness recovery processing decreases substantially linearly with increasing frequency. Therefore, unnatural luminance variation (i.e., an adverse effect of the sharpness recovery processing) will not occur. The sharpness recovery processing capable of preventing the luminance variation from being perceived can be realized.

As mentioned above, the apparatus according to the present exemplary embodiment performs the sharpness recovery processing with the sharpness recovery filter. However, the present invention is not limited to the above-mentioned example. For example, instead of using the sharpness recovery filter, it is also useful to store the frequency characteristic Fb(u) in the parameter holding unit 105 and use the frequency characteristic Fb(u) for the sharpness recovery processing. The sharpness recovery processing to be performed in this case includes obtaining a frequency characteristic I(u) of an input image "i" by applying Fourier transformation to the input image "i". Further, the sharpness recovery processing includes obtaining a frequency characteristic I' subjected to the sharpness recovery processing by calculating a product of the frequency characteristic I(u) of the input image "i" and the frequency characteristic Fb(u) of the sharpness recovery at each frequency u of the frequency space. Further, the sharpness recovery processing includes obtaining an image "i'" subjected to the sharpness recovery processing by applying inverse Fourier transformation to the acquired frequency characteristic I'.

Further, in the above-mentioned exemplary embodiment, focusing on the predetermined frequency u1, the amplitude gain is fixed in the frequency region higher than the predetermined frequency u1. However, focusing on the predetermined response value instead of the predetermined frequency, it is also useful to calculate a frequency u_lim at which a predetermined response value (e.g., amplitude gain) F_lim can be attained and fix the frequency characteristic to a constant value in a frequency region higher that the frequency u_lim. Alternatively, it is feasible to prevent the response value (e.g., amplitude gain) from exceeding the predetermined value F_lim. Ordinarily, the frequency characteristic P(u) of an output image attenuates with increasing frequency. Therefore, if the upper limit of the response value (e.g., amplitude gain) is set to the predetermined value F_lim or lower as mentioned above, the frequency characteristic of the recovery processing becomes similar to that obtainable by using the amplitude gain fixed in the frequency region higher than the predetermined frequency.

Second Exemplary Embodiment

Hereinafter, image processing and information processing according to the second exemplary embodiment will be described in detail below. The present exemplary embodiment is characterized by suppressing the frequency characteristic Fc(u) of a filter to be used in the sharpness recovery processing in such a way as to decrease substantially linearly relative to a target frequency characteristic in the predetermined frequency region from u1 to u2, so that the luminance variation caused by the sharpness recovery processing can be prevented from being perceived.

In the present exemplary embodiment, constituent components substantially similar to those described in the above-mentioned first exemplary embodiment are denoted by the reference numerals already used and redundant description thereof will be avoided.

The fact having been derived by the inventor of the present invention is that the reduction in luminance (average brightness of one cycle) of an amplitude image at a specific frequency through the sharpness recovery processing changes substantially linearly relative to the amplitude gain of the sharpness recovery filter. The present exemplary embodiment includes obtaining an amplitude gain at which the luminance to be attained at the predetermined frequency u1 through the sharpness recovery processing substantially coincides with the luminance to be attained at the frequency u2 (i.e., the frequency corresponding to the output resolution) through the sharpness recovery processing, when the input average value (luminance) at each frequency is constant, with reference to the above-mentioned relationship between the frequency and the luminance. Further, the present exemplary embodiment includes designing the frequency characteristic of the sharpness recovery filter in such a way as to decrease substantially linearly (for example, decrease along a straight line connecting the amplitude gain at the frequency u1 and the amplitude gain at the frequency u2) in the frequency region between u1 and u2, thereby realizing sharpness recovery processing capable of preventing the luminance variation from being perceived.

Hereinafter, the second exemplary embodiment will be described in detail below with reference to FIGS. 15A, 15B, and 16. FIG. 15A illustrates straight lines u_a, u_b, and u_c, respectively representing average luminance of an output image in relation to the amplitude gain in the sharpness recovery processing in a case where frequencies of input rectangular waves are u_a, u_b, and u_c (u_a<u_b<u_c). As understood from FIG. 15A, luminance L* of the output image changes substantially linearly with increasing amplitude gain of the filter. On the other hand, FIG. 15B illustrates a relationship between the amplitude gain and the frequency, represented by a straight line connecting a plurality of points at which the luminance of the output image becomes L1. As understood from FIG. 15B, the amplitude gain attaining predetermined luminance changes substantially linearly in a frequency region higher than a specific frequency. Accordingly, in the frequency region higher than the specific frequency, it is feasible to control the luminance to be attained through the sharpness recovery processing by controlling the amplitude gain.

FIG. 16 illustrates an example of the frequency characteristic Fc(u) of the sharpness recovery filter according to the present exemplary embodiment. In FIG. 16, L1' represents average luminance of an output image at the frequency u1, which is obtainable when the image is subjected to the sharpness recovery processing performed with amplitude gain $\beta=R(u1)$. Further, L2' represents average luminance of an output image at the frequency u2 (i.e., the frequency higher than the frequency u1), which is obtainable when the image is subjected to the sharpness recovery processing performed with amplitude gain $\beta=R(u1)$. Further, L1 represents average luminance of an output image at the frequency u1, and L2 represents average luminance of an output image at the frequency u2, which are obtainable when the image is not subjected to the recovery processing (i.e., amplitude gain $\alpha=1.0$). In this case, an amplitude gain $\chi$ at which L2" substantially coincides with L1' can be obtained by using the following formula (5), in which a relationship $\alpha<\chi<\beta$ is satisfied.

$$\chi=\alpha+(\beta-\alpha)\times(L1'-L2)/(L2'-L2) \quad (5)$$

In the formula (5), a relationship $L2>=L1'>L2'$ is satisfied.

FIG. 17 illustrates an example of frequency characteristic Lc(u) of the average luminance of the output image subjected to the sharpness recovery processing in this case. When the sharpness recovery processing is performed with the frequency characteristic Fc(u) represented by the straight line connecting two points (u1, $\beta$) and (u2, $\chi$), the average luminance Lc(u) of the output image can be fixed to a constant value in the frequency region from u1 to u2, as illustrated by a solid line in FIG. 17. As a result, the luminance variation can be prevented from being perceived. For example, the frequency characteristic Fc(u) of such a filter can be defined by the following formula (6).

$$Fc(u)=R(u) \ (0<=u<u1)=\beta-(\beta-\chi)\times(u-u1)/(u2-u1) \ (u1<=u) \quad (6)$$

The formula (5) determines the amplitude gain $\chi$ in such a manner that L1' and L2" substantially coincide with each other. However, as illustrated by a solid line in FIG. 18, it is also useful to acquire a difference $\Delta L1$ between L1 and L1' and determine L2" in such a way as to substantially equalize a difference $\Delta L2$ between L2 and L2" with $\Delta L1$, and then calculate the amplitude gain $\chi$ by linear interpolation.

Further, the above-mentioned description includes fixing the amplitude gain to $\beta=R(u1)$ in the frequency region from u1 to u2 in obtaining L1' and L2' as illustrated in FIG. 16. Further, the above-mentioned description includes setting the amplitude gain $\alpha$ to 1.0 at the frequency u2 in obtaining L2. However, if the gains $\alpha$ and $\beta$ are mutually different, the frequency characteristic Fc(u) can be calculated according to the formulae (5) and (6) as mentioned above. For example, the frequency characteristic Fc(u) may be obtained by setting the amplitude gain $\alpha$ to 0.8. Setting the amplitude gain $\alpha$ smaller than 1 is effective for a medium that tends to cause black defects (e.g., large bleeding of dots) because the luminance of an output image can be prevented from being reduced. When the amplitude gain $\alpha$ is 1.0, it is feasible to use a chart similar to the chart to be used for the measurement of the frequency characteristic before the sharpness recovery. Therefore, setting the amplitude gain to 1.0 is desirable to reduce the measurement costs. Further, the linearity illustrated in FIG. 15 cannot be obtained if clipping occurs. The clipping is a phenomenon that a pixel value obtainable through the sharpness recovery exceeds an input pixel value range. Therefore, it is desirable that the average value of the measurement chart is adjacent to an intermediate level of the input pixel value range and amplitude gain $\beta$ is within a range that does not cause any clipping.

An apparatus configuration and a recovery processing flow are similar to the configuration and the processing flow described with reference to FIGS. 9 and 10 in the first exemplary embodiment. Therefore, redundant description thereof will be avoided.

Hereinafter, a filter generation procedure will be described in detail below with reference to FIG. 19. If processing is similar to that described with reference to FIG. 12 in the first exemplary embodiment, redundant description thereof will be avoided.

In step S1901, the CPU 151 controls the image forming unit 108 to output a frequency characteristic measurement chart (e.g., the chart illustrated in FIG. 13) with reference to the output condition "Oi". Further, the CPU 151 acquires information required to acquire the frequency characteristic from the measurement chart by using the measurement apparatus (not illustrated). The CPU 151 calculates a frequency response value P(u) of the image forming apparatus corresponding to the output condition "Oi", for example, according to the formula (4)'. The CPU 151 does not perform the sharpness recovery processing during the output of the measurement chart.

Next, in step S1902, the CPU 151 acquires luminance reduction amounts (L1 and L2 illustrated in FIGS. 16 and 17) at the frequencies u1 and u2 by using a measurement apparatus (not illustrated) connected to the general-purpose interface 152, in a state where the sharpness recovery processing is not performed. For example, the CPU 151 can calculate optical density at each of the frequencies u1 and u2 by using a microdensitometer with reference to the frequency characteristic measurement chart output in step S1901, and can convert the calculate value into brightness L.

Next, in step S1903, the CPU 151 calculates an amplitude gain $\beta=R(u1)=1/P(u1)$ based on the frequency response value P(u) of the image forming apparatus acquired in step S1901. Further, the CPU 151 obtains a frequency characteristic Fb(u) having a fixed value $\beta$ in the frequency region higher than the frequency u1, according to the formula (3). Then, the CPU 151 generates a sharpness recovery filter fb by applying inverse Fourier transformation to the obtained characteristic.

Next, in step S1904, the CPU 151 controls the recovery processing unit 107 to perform recovery processing on the frequency characteristic measurement chart by using the sharpness recovery filter fb. Further, the CPU 151 controls the image forming unit 108 to output an image subjected to the recovery processing that corresponds to the output condition "Oi".

Next, in step S1905, the CPU 151 acquires luminance values (L1' and L2' in FIGS. 16 and 17) at the frequencies u1 and u2, which can be obtained through the recovery processing. The processing for acquiring the luminance values is similar to that in step S1902.

Next, in step S1906, the CPU 151 calculates an amplitude gain χ at which a relationship L2" nearly=L1' is satisfied, by using L1', L2, and L2' according to the formula (5).

Next, in step S1907, the CPU 151 calculates a frequency characteristic Fc(u) of the sharpness recovery filter according to the formula (6) based on the amplitude gain χ calculated in step S1906. Then, the CPU 151 generates a sharpness recovery filter fc capable of preventing the luminance reduction from being perceived by applying inverse Fourier transformation to the acquired frequency characteristic Fc(u).

Similar to the first exemplary embodiment, the CPU 151 performs sequential processing in steps S1901 to S1907 for each output condition "Oi" in the present exemplary embodiment. The CPU 151 stores the generated filter in the parameter holding unit 105, while associating it with the correspondence LUT.

Modified Embodiment

The method for suppressing the reduction in luminance to be attained through the sharpness recovery processing according to the above-mentioned first exemplary embodiment includes fixing the amplitude gain value of the predetermined frequency lower than the frequency corresponding to output resolution, by focusing on the amplitude gain value. Further, the method according to the above-mentioned second exemplary embodiment includes determining the luminance at the frequency corresponding to the output resolution based on the luminance at a predetermined frequency, by focusing on the relationship between the amplitude gain at each frequency and the luminance to be attained through the sharpness recovery processing. Further, the method includes preventing the variation in luminance from being perceived by controlling the amplitude gain in such a way as to suppress the reduction in luminance, in the frequency region higher than the predetermined frequency. The present exemplary embodiment provides a method capable of assuring balance between sharpness and variation in luminance by controlling both the amplitude gain and the luminance.

If the frequency characteristic L(u) of the luminance to be attained through the sharpness recovery processing is less in luminance reduction compared to an inverse filter and is capable of preventing the variation in luminance from being perceived, it is not always necessary to set the filter characteristic to be substantially linear in the frequency region higher than the predetermined frequency. However, if the filter characteristic to be used for the recovery processing includes an inflection point (i.e., a point at which the sign of secondary differentiation changes) or a discontinuous point a non-differentiable point), the luminance varies unnaturally in the vicinity of these points. Therefore, it is desirable that the frequency characteristic to be used for the recovery processing does not include any inflection point or any discontinuous point.

Frequency characteristic applicable to the recovery processing will be described in detail below with reference to FIGS. 20A, 20B, and 20C.

FIGS. 20A, 20B, and 20C include curves (A-1) to (A-4), curves (B-1) to (B-3), and curves (C-1) to (C-2), each representing filter frequency characteristic in the frequency region u1<u<u2, as described in detail below. FIGS. 20A, 20B, and 20C further include curves (a-1) to (a-4), curves (b-1) to (b-3), and curves (c-1) to (c-2), each representing the luminous characteristic L(u) obtainable when the sharpness recovery processing is performed with the filter characteristics (A-1) to (C-2), respectively.

The filter frequency characteristic (A-1) is the frequency characteristic F(u) that is constantly 1.0 in the frequency region u1<u<u2. In this case, effects of the sharpness recovery processing cannot be obtained sufficiently, although the reduction in luminance is not caused by the sharpness recovery processing.

The filter frequency characteristic (A-2) represents the inverse characteristic R(u). If the sharpness recovery processing is performed with the inverse characteristic R(u), a large reduction in luminance occurs in a high-frequency region, as understood from luminous characteristic (a-2).

The filter frequency characteristic (A-3) represents the frequency characteristic Fb(u) of the sharpness recovery filter fb described in the first exemplary embodiment. The frequency characteristic (A-3) has a fixed value F(u1) in the frequency region u1<u<u2. The luminance changes substantially linearly and moderately in the frequency region u1<u<u2, as understood from luminous characteristic (a-3). Therefore, using the frequency characteristic (A-3) is effective to prevent the luminance variation from being perceived.

The filter frequency characteristic (A-4) represents the frequency characteristic Fc(u) of the recovery filter according to the second exemplary embodiment. The amplitude gain of the frequency characteristic (A-4) at the frequency u2 is determined according to the formula (6) in such a way as to match the luminance obtainable through the recovery processing at the frequency u2 with the luminance obtainable through the recovery processing at the frequency u1. In this case, the frequency characteristic (A-4) varies substantially linearly in the frequency region u1<u<u2. The experiment conducted by the inventor has revealed that the luminance to be attained through the recovery processing changes substantially linearly if the frequency characteristic changes substantially linearly. Because the luminance obtainable through the recovery processing at the frequency u2 coincides with the luminance obtainable at the frequency u1, the luminance obtainable by using the frequency characteristic (A-4) is substantially constant in the frequency region u1<u<u2, as understood from luminous characteristic (a-4). Therefore, using the frequency characteristic (A-4) brings an effect of realizing processing capable of sufficiently preventing the variation in luminance from being perceived.

As mentioned above, if the characteristic is capable of preventing the variation in luminance from being perceived, substantially matching the luminance levels to be attained at the frequencies u1 and u2 through the recovery processing is not always necessary. In addition, changing the filter characteristic substantially linearly is not always necessary. For example, any one of the frequency characteristics (B-1) to (B-3) can be used as the frequency characteristic of the recovery filter.

The frequency characteristic (B-1) changes substantially linearly in the frequency region u1<u<u2. However, the amplitude gain of the frequency characteristic (B-1) at the frequency u2 is larger than the amplitude gain of the frequency characteristic (A-4) at the frequency u2. Accordingly, although the luminance (b-1) to be attained through the recovery processing decreases substantially linearly with increasing frequency, the recovery processing using the frequency characteristic (B-1) brings a larger recovery effect compared to the recovery processing using the frequency characteristic (A-4). Therefore, using the frequency characteristic (B-1) is desirable if enhancing the processing effect is prioritized over the suppressing of reduction in luminance. Although not illustrated, if the frequency characteristic to be used for the recovery processing is frequency characteristic (B-1)', in which the amplitude gain at the frequency u2 is set to be smaller than the amplitude gain of the frequency characteristic (A-4) at the frequency u2, it is feasible to suppress the reduction in luminance more sufficiently. However, the luminous characteristic has an unnatural shape protruding downward in the vicinity of the frequency u1. Therefore, performing the recovery processing using the frequency characteristic (A-4), rather than using the frequency characteristic (B-1)', is useful to prevent the variation in luminance from being perceived at the frequency u1.

Each of the frequency characteristics (B-2) and (B-3) changes nonlinearly in the frequency region u1<u<u2. In this case, the luminous characteristic decreases moderately with increasing frequency as apparent from curves (b-2) and (b-3). Therefore, the variation in luminance can be prevented from being perceived.

On the other hand, if the characteristic of the filter to be used for the recovery processing is the frequency characteristic (C-1) including an inflection point (i.e., a point at which the sign of secondary differentiation changes), its luminous characteristic (c-1) includes an inflection point correspondingly. In this case, variation in luminance, which is generally known as "Mach band", can be easily perceived in the vicinity of the inflection point of the luminous characteristic (c-1). Therefore, it is desirable that the characteristic of the filter to he used for the recovery processing does not include any inflection point. In addition, the Mach hand can be easily perceived at the discontinuous point of the luminance. Therefore, for example, if the frequency characteristic to be used for the recovery processing is frequency characteristic (C-2) that includes a discontinuous point, its luminous characteristic (c-2) includes a discontinuous point correspondingly. In this case, variation in luminance can be easily perceived. Accordingly, it is desirable that the characteristic of the filter to be used for the recovery processing does not include any discontinuous point in the frequency region higher than the predetermined frequency.

Using the above-mentioned frequency characteristic that does not include any inflection point or any discontinuous point as illustrated in FIGS. 20A and 20B can realize sharpness recovery processing capable of preventing the variation in luminance from being perceived.

To simplify the above-mentioned description of the exemplary embodiment, the frequency characteristic P(u) of an output image is defined as a one-dimensional function. However, it is known that a general printer has anisotropic frequency characteristic. In actual, it is desirable to determine the frequency characteristic of the recovery filter as a two-dimensional function P(u, v), in which v represents frequency in a direction normal to the frequency u.

Further, in the above-mentioned exemplary embodiment, the predetermined frequency u1 is the visual limit frequency u_vis. However, the frequency u1 is not limited to u_vis. For example, it is feasible to determine the frequency u1 based on a change amount in luminance (reduction in brightness) before and after the processing, not the visual sensitivity. More specifically, the frequency at which the luminance change amount before and after the processing becomes $L^*=2$ (where discriminating the difference by alienation comparison is difficult) can be used as the frequency u1.

Further, in the above-mentioned exemplary embodiment, the frequency u2 is the frequency u_max corresponding to the output resolution of the image forming apparatus. However, an image forming apparatus may not be able to form an image corresponding to the output resolution if an output condition "O" combined with the image forming apparatus is inadequate. For example, in a case where the image forming apparatus is a inkjet printer and a recording medium is a plain paper (not a dedicated paper), forming an image based on a high-frequency input signal is difficult because unacceptable bleeding of ink occurs. In the case where the image forming apparatus cannot form an image when the frequency of an input signal exceeds u_max', a substantially uniform image is formed based on an average brightness of the signal in the frequency region higher than the frequency u_max'. Accordingly, the degree of luminance reduction in the frequency region higher than the frequency u_max' is substantially the same as that of the frequency u_max'. In other words, the linearity illustrated in FIG. 8B cannot be realized in the frequency region higher than the frequency u_max'. Therefore, in such a case, it is desirable to use the frequency u_max' (not the frequency u_max corresponding to the output resolution of the image forming apparatus) or appropriate frequency lower than the frequency u_max' as the frequency u2 so that a moderate change can be realized.

Further, the present invention can be realized by processing that includes supplying a program that can realize at least one of the functions of the above-mentioned exemplary embodiments to a system or an apparatus via a network or an appropriate storage medium and causing at least one processor of a computer of the system or the apparatus to read and execute the program. Further, the present invention can be also realized by a circuit (e.g., ASIC) that can realize at least one of the above-mentioned functions.

According to the present invention, the sharpness recovery processing capable of preventing the brightness reduction from being perceived can be easily realized.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)(Trade mark)), a flash memory device, a memory card, and the like.

While the present invention has been described with reference to exemplary embodiments, it is to he understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-110217, filed May 29, 2015, which is hereby incorporated by reference herein in its entirety.

The invention claimed is:

1. An image processing apparatus, comprising:
an acquisition unit configured to acquire an output condition when an image forming apparatus forms an image on a recording medium based on image data; and
a processing unit configured to perform image processing on the image data for improving sharpness of the image by using a parameter based on the output condition,
wherein the parameter represents such a characteristic that the image formed by the image forming apparatus has a luminous characteristic in relation to spatial frequency that remains constant or decreases continuously without causing any inflection point or any discontinuous point in a frequency band from a predetermined frequency to a limit frequency of the image forming apparatus.

2. The image processing apparatus according to claim 1, wherein the pre-determined frequency is a spatial frequency at which recognizing the sharpness of the image is difficult.

3. The image processing apparatus according to claim 1, wherein the parameter is a coefficient for a filter and the image processing is convolution processing of the filter.

4. The image processing apparatus according to claim 1, wherein the parameter is a frequency characteristic and the image processing is processing for calculating a product for the filter in a frequency space.

5. An image processing apparatus, comprising:
an acquisition unit configured to acquire an output condition when an image forming apparatus forms an image on a recording medium based on image data; and
a processing unit configured to perform image processing on the image data for improving sharpness of the image by using a parameter based on the output condition,
wherein the parameter represents such a characteristic that degree of improvement in sharpness is enhanced in a specific frequency range lower than a predetermined frequency, in spatial frequencies of the formed image, in which contribution to visibility is sufficiently smaller, and that the degree of improvement in the sharpness remains constant or decreases continuously without causing any inflection point or any discontinuous point in a frequency band higher than the predetermined frequency and reaching a limit frequency of the image forming apparatus.

6. The image processing apparatus according to claim 5, wherein the frequency characteristic of the parameter changes substantially linearly in the frequency band higher than the predetermined frequency and reaching the limit frequency of the image forming apparatus.

7. The image processing apparatus according to claim 6, wherein the frequency characteristic of the parameter remains constant, with respect to an amplitude gain at the predetermined frequency, in the frequency band higher than the predetermined frequency and reaching the limit frequency of the image forming apparatus.

8. The image processing apparatus according to claim 6, wherein the frequency characteristic of the parameter is determined in such a manner that luminance at the limit frequency of the image forming apparatus becomes substantially the same as luminance at the predetermined frequency.

9. The image processing apparatus according to claim 2, wherein the frequency characteristic of the parameter is determined in such a manner that a difference in luminance before and after recovery processing at the limit frequency of the image forming apparatus becomes substantially to the same as a difference in luminance at the predetermined frequency.

10. An image processing method, comprising:
acquiring an output condition when an image forming apparatus forms an image on a recording medium based on image data, and performing image processing on the image data for improving sharpness of the image by using a parameter based on the output condition,
wherein the parameter represents such a characteristic that the image formed by the image forming apparatus has a luminous characteristic in relation to a spatial frequency that remains constant or decreases continuously without causing any inflection point or any discontinuous point in a frequency band from a predetermined frequency to a limit frequency of the image forming apparatus.

11. An image processing method, comprising:
acquiring an output condition when an image forming apparatus forms an image on a recording medium based on image data, and performing image processing on the image data for improving sharpness of the image by using a parameter based on the output condition,
wherein the parameter represents such a characteristic that the degree of improvement in sharpness is enhanced in a specific frequency range lower than a predetermined frequency, in spatial frequencies of the formed image, in which contribution to visibility is sufficiently small, and that the degree of improvement in the sharpness remains constant or decreases continuously without causing any inflection point or any discontinuous point in a frequency band higher than the predetermined frequency and reaching a limit frequency of the image forming apparatus.

12. A computer-readable non-transitory recording medium storing a program that causes a computer to perform image processing method, the method comprising:
acquiring an output condition when an image forming apparatus forms an image on a recording medium based on image data, and performing image processing on the image data for improving sharpness of the image by using a parameter based on the output condition for improving sharpness of the image,
wherein the parameter represents such a characteristic that a degree of improvement in sharpness is enhanced in a specific frequency range lower than a predetermined frequency, in spatial frequencies of the formed image, in which contribution to visibility is sufficiently small, and that the degree of improvement in the sharpness remains constant or decreases continuously without causing any inflection point or any discontinuous point in a frequency band higher than the predetermined frequency and reaching a limit frequency of the image forming apparatus.

* * * * *